(12) United States Patent
Yeh et al.

(10) Patent No.: US 8,427,454 B2
(45) Date of Patent: Apr. 23, 2013

(54) ELECTROMAGNETIC PEN WITH A MULTI-FUNCTIONS TAIL PART

(75) Inventors: Chia-Jui Yeh, Taipei (TW); Jen-Shuo Liu, Hsin-Chu (TW)

(73) Assignee: Waltop International Corporation, Hsinchu (TW)

( * ) Notice: Subject to any disclaimer, the term of this patent is extended or adjusted under 35 U.S.C. 154(b) by 430 days.

(21) Appl. No.: 12/796,144

(22) Filed: Jun. 8, 2010

(65) Prior Publication Data

US 2011/0297457 A1   Dec. 8, 2011

(51) Int. Cl.
*G06F 3/033* (2006.01)

(52) U.S. Cl.
USPC .......................................................... 345/179

(58) Field of Classification Search .................... 345/179
See application file for complete search history.

(56) References Cited

U.S. PATENT DOCUMENTS

| | | | |
|---|---|---|---|
| 4,697,050 A | 9/1987 | Farel et al. | |
| 4,827,086 A * | 5/1989 | Rockwell | 178/19.01 |
| 5,325,110 A | 6/1994 | Tang et al. | |
| 5,401,916 A | 3/1995 | Crooks | |
| 5,576,502 A | 11/1996 | Fukushima et al. | |
| 5,793,360 A | 8/1998 | Fleck et al. | |
| 2006/0094464 A1 * | 5/2006 | Kyou et al. | 455/556.1 |
| 2007/0139399 A1 * | 6/2007 | Cook | 345/179 |
| 2007/0146351 A1 * | 6/2007 | Katsurahira et al. | 345/179 |
| 2008/0150918 A1 * | 6/2008 | Hagen et al. | 345/179 |

* cited by examiner

*Primary Examiner* — Chanh Nguyen
*Assistant Examiner* — Long D Pham
(74) *Attorney, Agent, or Firm* — Muncy, Geissler, Olds & Lowe, PLLC

(57) ABSTRACT

The present invention relates to a multi-function electromagnetic pen, and particularly relates to an electromagnetic pen with a multi-function tail part. This electromagnetic comprises a body, a pen-tip part, and a multi-function electromagnetic ring. The pen-tip part is disposed on the front part of the electromagnetic pen and the multi-function electromagnetic ring is disposed on the tail part (or rear end part) of the electromagnetic pen. The multi-function electromagnetic ring can emit different electromagnetic signals with different frequencies. These electromagnetic signals with different frequencies are defined by a tablet to represent different functions (or modes), for example erasing function (or mode), magnifying function (or mode), and palette knife function (or mode). A user can control and change the frequency of the electromagnetic signal emitted form the multi-function electromagnetic ring by pressing the switch on the body of the electromagnetic pen. By this way, the function of the multi-function electromagnetic ring can be controlled and changed. Therefore, it has no need to perform or start the function (or mode) of the tail part of the electromagnetic pen (or the multi-function electromagnetic ring) by the contact between the back part the electromagnetic pen (or the multi-function electromagnetic ring) and the tablet. Accordingly, the tail part the electromagnetic pen (or the multi-function electromagnetic ring) can work above the tablet without contact with the tablet, and it can prevent the tail part the electromagnetic pen from the damage caused by the contact.

13 Claims, 5 Drawing Sheets

ELECTROMAGNETIC PEN WITH A MULTI-FUNCTIONS TAIL PART

FIELD OF THE INVENTION

The present invention relates to a multi-function electromagnetic pen, and particularly relates to an electromagnetic pen with a multi-function tail part.

BACKGROUND OF THE INVENTION

An electromagnetic hand writing input device (or a hand writing tablet) is typically used by a user with a tablet and an electromagnetic pen type stylus (after, saying electromagnetic pen). The conventional electromagnetic pen is a pen having a "sharp-shaped" pen-tip inserted in it's front part for writing or selecting objects on the tablet. An erasing device, which is a slim cylindrical type electromagnetic eraser, is deposed on tail part (or rear end part) of the electromagnetic pen for erasing words, patterns, or marks on the tablet.

When a user painting on the tablet with the "sharp-shaped" pen-tip, most technique of painting can be performed by this "sharp-shaped" pen-tip, but it can not exactly simulate the unique paint effects of oil paintings which are painting by palette knifes. It is because the palette knifes for oil painting have different shapes and different sizes. The shapes of the palette knifes include various kinds of shapes, for example sharp shape, needle shape, elliptic shape, and so forth. Therefore, the paint effects of oil paintings are unique and varied. Furthermore, people can use the same palette knife with actions of pressing, dragging, wiping and scraping to paint an oil painting having different paint effect therein, or people can use a palette knife to scrap the oil painting for removing the unsatisfied drawing or color and then painting it again. These are the effects and functions that the current "sharp-shaped" electromagnetic pens applied to tablets can not achieve and have.

Besides, many conventional electromagnetic pens have a erasing device deposed on their tail parts, and there are many patents about these electromagnetic pens have a erasing device deposed on their tail parts, for example U.S. Pat. Nos. 4,697,050, 5,325,110, 5,401,916, 5,576,502, and 5,793,360. However, most of the electromagnetic pens disclosed by these patents have some drawbacks. Taking patent U.S. Pat. No. 4,697,050 as an example, the patent U.S. Pat. No. 4,697,050 discloses a electromagnetic pen 10 having a lead 12 deposed on one end of the electromagnetic pen 10 and an eraser 14 deposed on another end of the electromagnetic pen 10 (as FIG. 1). A user controls the oscillator circuit 18 to emit the electromagnetic signal with special frequency by pressing the switch 16 or the switch 17 and the tablet recognizes that the electromagnetic pen 10 is in writing mode or in erasing mode by the electromagnetic signal emitted by the oscillator circuit 18. However, the electromagnetic pen 10 has a drawback that it has a need of the spring structure 19 for moving the eraser 14 back. Therefore, the structure of the electromagnetic pen 10 is more complicated and the cost and difficulty for fabricating the electromagnetic pen 10 is increased. The another drawback of the electromagnetic pen 10 is that the eraser 14 needs to contact the tablet and rub against the tablet continuously during erasing because the eraser 14 need to be moved back to turn on the switch 15 by touching the tablet for turning on the erasing mode. Therefore, the eraser 14 made of plastics or rubbers will be worn out frequently and it has a need of changing the eraser 14 frequently. Therefore, the cost for using the electromagnetic pen 10 is increased and it is inconvenient to the user.

The patent U.S. Pat. No. 5,576,502 discloses an electromagnetic pen 20 having a cylindrical shape (as FIG. 2). There is a coil 22 deposed in the tail part (or rear end part) of the electromagnetic pen 20 for erasing. The coil 22 is covered by a back cover 24 having circular head and there is a coil spring 26 deposed under the back cover 24 for moving the back cover 24 back to stop erasing when the electromagnetic pen 20 is moved away from the tablet. When erasing by the electromagnetic pen 20, the back cover 24 touch the tablet and back cover 24 is pressed by the tablet. Therefore, the back cover 24 moves toward the coil spring 26 for compressing the coil spring 26 to turn on the switch in the electromagnetic pen 20 for turning on the erasing mode. Therefore, the electromagnetic pen 20 needs to contact the tablet continuously during erasing. However, the stricture of this "pressing-type" electromagnetic pen 20 is more complicated and the cost for fabricating this "pressing-type" electromagnetic pen 20 is increased because of the need of the coil spring 26. Besides, the uncomfortable noises are caused by rubbing between the electromagnetic pen 20 and tablet during erasing, and it is easy to damage the surface of the tablet and to wear the tail part of the electromagnetic pen 20.

The patent U.S. Pat. No. 5,793,360 discloses an electromagnetic pen 20 having a digitizer eraser method wherein an electromagnetic pen is used to select the different cursors having different shapes for writing or erasing. In this method, an application program is applied to recognize the current cursor for judging whether the user erases words or objects on the tablet. However, the electromagnetic pen adopted by this patent is the same with the electromagnetic pens disclosed in the patent U.S. Pat. No. 4,697,050 and the patent U.S. Pat. No. 5,576,502. All of them are the "pressing-type" electromagnetic pen 20 and they have the same drawbacks.

As above mentioned patents, most of the tail parts of the electromagnetic pens only have single function, and there is no any tail part of above-mentioned electromagnetic pens having multi-functions. Therefore, the electromagnetic pens only have single function and single operation mode, and they can not achieve the demand of diversification and multi-function for electric devices. Furthermore, most erasers (or erasing devices) deposed on the tail parts of the electromagnetic pens have a circular head as the back cover 24 illustrated in FIG. 2. Therefore, like the "sharp-shaped" pen-tip of the electromagnetic pen, they can not be applied to paint a drawing having characteristics and paint effects of oil paintings on the tablet by actions of pressing, dragging, wiping and scraping.

Therefore, in view of foregoing drawbacks of the conventional electromagnetic pens, there is a need to provide a multi-function electromagnetic pen having characteristics of simple structure and low cost, and particularly to provide a electromagnetic pens which has no need of a spring structure deposed on the tail part of the electromagnetic pen and has functions of erasing, magnifying, palette knife, and so forth. Furthermore, the tail part of multi-function electromagnetic pen has no need to contact (or touch) and rub the tablet during erasing, and the noises and damages caused by the contact and the rub between the tail part of multi-function electromagnetic pen and the tablet can be prevented.

SUMMARY OF THE INVENTION

An objective of this invention is to provide a multi-function electromagnetic pen having characteristics of simple structure and low cost. The tail part of the multi-function electromagnetic pen has functions of erasing, magnifying, palette knife, and so forth, so the multi-function electromagnetic pen has varied operation modes and functions. Furthermore, the tail part of multi-function electromagnetic pen has no need to contact (or touch) and rub the tablet during erasing, and the noises and damages caused by the contact and the rub between the tail part of multi-function electromagnetic pen and the tablet can be prevented.

In one embodiment of the present invention, an electromagnetic pen with a multi-function tail part is disclosed. This electromagnetic pen has characteristics of simple structure and low cost and has various functions, such as erasing function, magnifying function, and palette knife function. The electromagnetic pen with a multi-function tail part comprises a body, a pen-tip part, and a multi-function electromagnetic ring. The body has a front part and a tail part (or rear end part). The pen-tip part is deposed on the front part of the body for writing or selecting on a tablet. The multi-function electromagnetic ring is deposed on the tail part of the body for emitting different electromagnetic signals to make the tail part of said electromagnetic pen to perform different functions in different situations, for example the functions erasing, magnifying, palette knife, and so forth. The tablet recognizes the current function performed by the tail part of the electromagnetic pen according to the frequency of the electromagnetic signal emitted from the multi-function electromagnetic ring. The multi-function electromagnetic ring is a broad, flat, and ring-shaped structure. Therefore, it assist the user to recognize and know which scope (or area) on the tablet is selected by the multi-function electromagnetic ring and which words or objects is selected by the multi-function electromagnetic ring, and then the words or objects, such as drawing or marks, in this selected scope or area can be erased or magnified. Furthermore, the flat multi-function electromagnetic ring and the palette knife can be used in the same way, because both of them have similar broad and flat shape. Therefore, the user can use the flat tail part of the electromagnetic pen as a palette knife to paint on the tablet with the actions of pressing, dragging, wiping and scraping to paint an oil painting for getting a painting having the paint effects of oil paintings on the tablet. The different functions and modes of the multi-function electromagnetic ring can be turned on without the contact (or the touch) between the multi-function electromagnetic ring and the tablet because the user controls the multi-function electromagnetic ring to emit electromagnetic signals and to change the frequency of the electromagnetic signal emitted by the multi-function electromagnetic ring by a switch deposed on the surface of the body. Therefore, the tail part of the electromagnetic pen (or the multi-function electromagnetic ring) can perform it's functions (or mode), such as erasing, above the tablet without the need of contact.

Therefore, the effect achieved with the present invention is to provide a multi-function electromagnetic pen which has simpler structure and lower cost and performs various functions, and particularly to provide an electromagnetic pens which has a tail part capable of performing many functions, such as erasing, magnifying, palette knife, and so forth. Furthermore, the tail part of multi-function electromagnetic pen has no need to contact (or touch) and rub against the tablet during erasing, and the noises and damages caused by the contact and the rub between the tail part of multi-function electromagnetic pen and the tablet can be prevented.

DESCRIPTION OF THE EXEMPLARY EMBODIMENTS

Although the present invention will be described in accordance with the embodiments shown as following, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Figure 1:
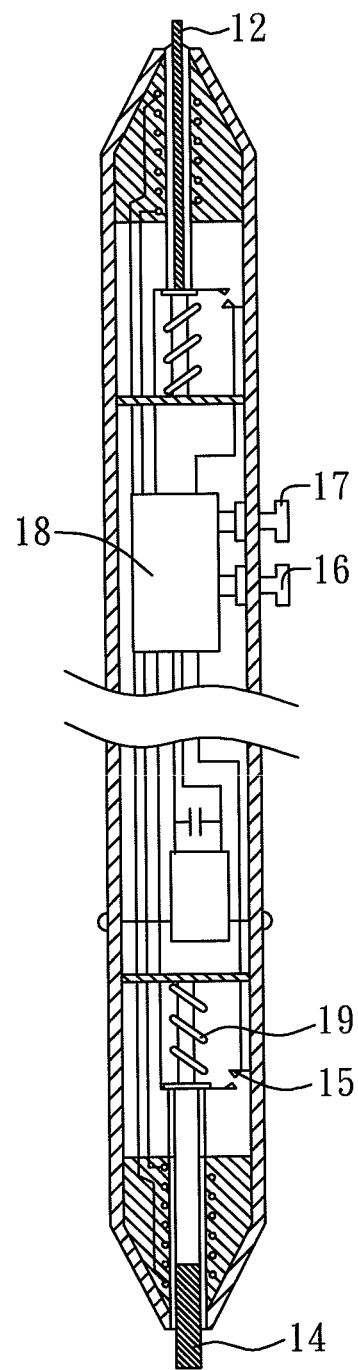
FIGS. 1 and 2 are cross-section form diagrams respectively illustrating conventional electromagnetic pens having an eraser deposed on their tail part.
Figure 2:
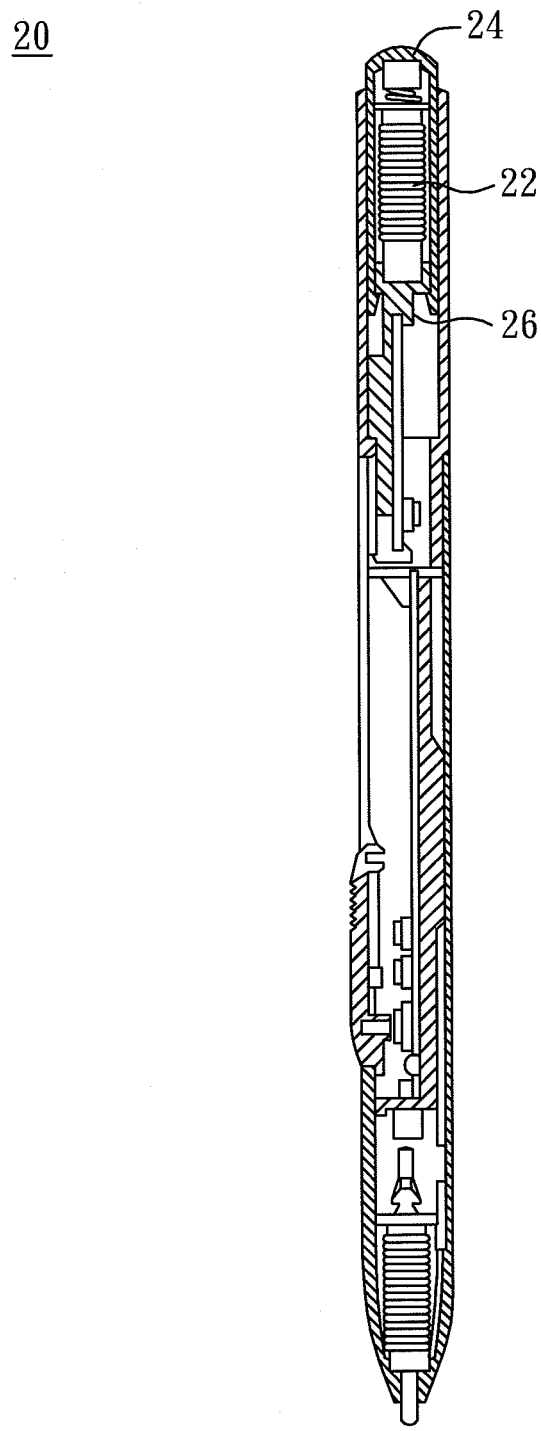
Figure 3:
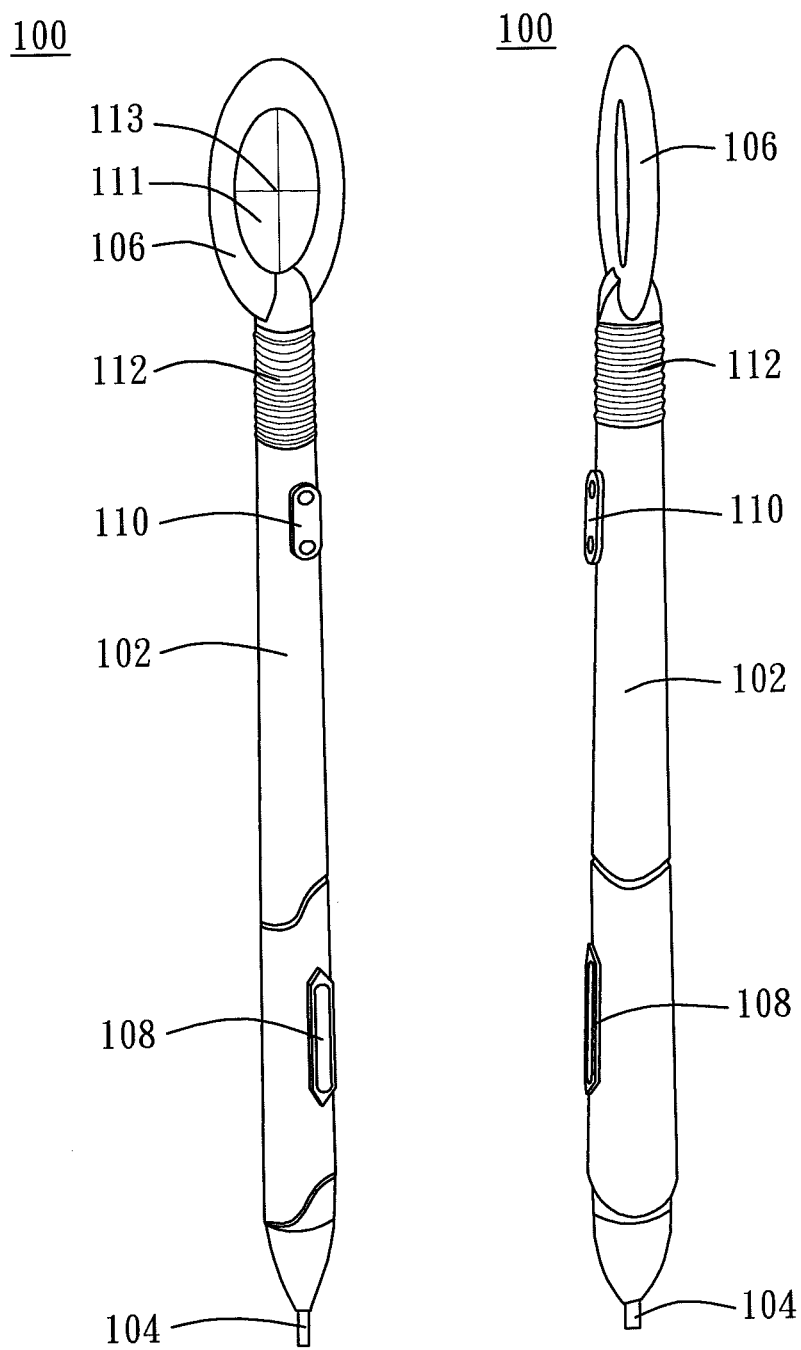
FIG. 3 is a stereoscopic form diagram illustrating an electromagnetic pen with a multi-function tail part at different angles in accordance with one embodiment of the present invention.

Referring to FIG. 3, it is a stereoscopic form diagram illustrating an electromagnetic pen 100 with a multi-function tail part at different angles in accordance with one embodiment of the present invention. The electromagnetic pen 100 with a multi-function tail part comprises a body 102 having a front part and a tail part (or a rear end part), a pen-tip part 104 and a flat and broad multi-function electromagnetic ring 106. The pen-tip part 104 is deposed on the front part of the body 102 and it applied to write, draw and select objects on a tablet by emitting the AC electromagnetic signals to the tablet or reflecting the electromagnetic signals emitted from the tablet. The flat and broad multi-function ring 106 is deposed on the tail part of the body 102 and it emits the electromagnetic signals with different frequencies to the tablet for making the tail part of the electromagnetic pen 100 to perform different functions, such as erasing, magnifying, palette knife, and so forth, in different situations.

There is a film 111, which is made of a glass, a thin film, a piece of plastics or other transparent materials, deposed on central area of said multi-function electromagnetic ring. It means that the film 111 is formed in the scope (or area) surrounded by the frame of the multi-function electromagnetic ring 106. There is a crisscross pattern 113, which is similar to the crisscross pattern in a scope of a rifle assisting the user to aim at the target, formed on a surface of the film by printing or etching for assisting a user to recognize where is the center point of the multi-function electromagnetic ring 106 for sensing. Of course, other pattern can be form on the film 111, for example a the circular pattern formed on the center of a target by printing or etching for assisting a user to recognize where is the center point of the multi-function electromagnetic ring 106 for sensing.

There is a first switch 108 deposed in the part of the body 102 near the pen-tip part 104 for controlling the pen to emit the electromagnetic signals with different frequencies. There is a second switch 110 deposed in the part of the body 102 near the multi-function electromagnetic ring 106 for controlling the multi-function electromagnetic ring 106 to emit the electromagnetic signals with different frequencies and for controlling and changing the current function performed by the multi-function electromagnetic ring 106.

Figure 4:
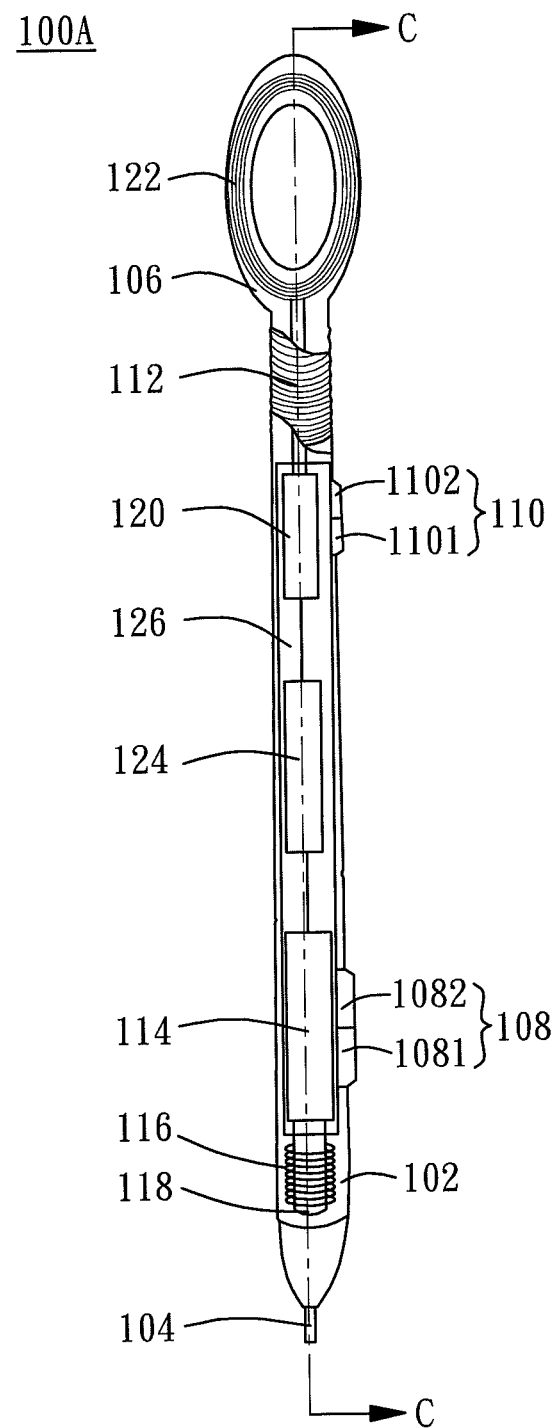
FIG. 4 is a perspective form diagram illustrating an electromagnetic pen with a multi-function tail part and a battery in accordance with one embodiment of the present invention.

Although all of the electromagnetic pens of this invention have the same appearances and external structures, but they can be classified into two types according to the inner structures and the designs of the electromagnetic pen. One type is an electromagnetic pen with a battery and another type is a multi-function tail part and a battery-free electromagnetic pen with a multi-function tail part. Referring FIG. 4, it is a perspective form diagram illustrating an electromagnetic pen 100A with a multi-function tail part and a battery in accordance with one embodiment of the present invention. Similarly, the electromagnetic pen 100A with a multi-function tail part comprises a body 102, a pen-tip part 104, and a multi-function electromagnetic ring 106. There is a first oscillator circuit 114 deposed in the front part of the body 102 or the pen-tip part 104 for emitting to electromagnetic signals to a tablet for enabling the pen-tip part 104 to write and select (or select objects or functions).

The first oscillator circuit 114 comprises a coil 116 wound around a ferrite core or a permeability material 118 for emitting electromagnetic signals. The first coil 116 is wound around a permeability material 118 and distributed (or extended) in a direction parallel to center line C of said body 102. The first switch 108, which is deposed on the part of the body 102 near the pen-tip part 104, comprises two side buttons 1081 and 1082 and they are respectively corresponded to a capacitance (not shows in FIG. 3). When a user presses the side button 1081 or the side button 1082, the capacitance corresponded to the side button 1081 or the side button 1082 is electrically connected with the first oscillator circuit 114, and then the corresponded capacitance begins working with the first oscillator circuit 114 for ordering the first oscillator circuit 114 (or the pen-tip part 104) to emit the electromagnetic signals or changing the frequency of the electromagnetic signal emitted by the first oscillator circuit 114 (or the front part). Therefore, the tablet can detect and sense the electromagnetic signals emitted from the front part of the electromagnetic pen 100A and it enable the pen-tip part 104 to write, draw or select objects on the tablet.

There is a second oscillator circuit 120 deposed in the tail part of the electromagnetic pen 100A or the body 102 for emitting different electromagnetic signals with different frequencies to the tablet. It enables the tablet to recognize the current mode and function performed by the broad, flat, multi-function electromagnetic ring 106. Therefore, the multi-function electromagnetic ring 106 can erase (erasing function or eraser function), magnify (magnifying function), paint as a palette (knife palette knife function) on the tablet. It means that the multi-function electromagnetic ring 106 perform erasing function (or eraser function), magnifying function, palette knife function and so forth. The second oscillator circuit 120 comprises a second coil 122 deposed in the multi-function electromagnetic ring 106. The second coil 122 is wound around inside the broad, flat multi-function electromagnetic ring 106 and the second coil 122 is distributed (or extended) in a direction perpendicular to center line C of the body 102. Therefore, the direction in which the second coil 122 is distributed (or extended) is perpendicular to the direction in which the first coil 116 is distributed (or extended).

The second switch 110, which is deposed on the part of the body 102 near the broad, flat, multi-function electromagnetic ring 106, also comprises two side buttons 1101 and 1102, and they are respectively corresponded to a capacitance (not shows in FIG. 3). The user can press one of the two side buttons 1101 and 1102 or press them simultaneously. Each ways for pressing the two side buttons 1101 and 1102 represents a operation mode or a function, for example enabling the second oscillator circuit 120 to begin emitting the electromagnetic signals for notifying the tablet that the multi-function electromagnetic ring 106 of the electromagnetic pen 100A begins to be operated on the tablet by the user, or electrically connecting the corresponded capacitance (or the corresponded capacitances) with the oscillator circuit 120 for changing the frequency of the electromagnetic signal emitted from the oscillator circuit 120 (or the multi-function electromagnetic ring 106) and changing the current operation mode and function performed by the multi-function electromagnetic ring 106. Each of the frequencies of the electromagnetic signals emitted from the multi-function electromagnetic ring 106 represent different functions. By recognizing the frequency of the electromagnetic signal emitted by the multi-function electromagnetic ring 106, the tablet recognizes the current mode and function performed by the broad, flat, multi-function electromagnetic ring 106, such as erasing (erasing or eraser function), magnifying (magnifying function), using as a palette knife (palette knife function) and so forth. The tablet recognizes the current function (or mode) performed by the multi-function electromagnetic ring 106, and then actions and changing, which are corresponded to the action performed on the tablet by the multi-function electromagnetic ring 106, are performed on the screen of the tablet.

Besides, there is a battery 124 deposed in the electromagnetic pen 100A for providing power to both of the first oscillator circuit 114 and the second oscillator circuit 120 to emit the electromagnetic signals. In this embodiment, there is a circuit board 126 deposed in the electromagnetic pen 100A, and all of the first oscillator circuit 114, the second oscillator circuit 120, the battery 124 and the capacitances corresponded to the side buttons 1081, 1082, 1101 and 1102 are deposed on the circuit board 126. However, in another embodiment of this invention, there are two circuit boards deposed in the body 102. The first oscillator circuit 114 and the capacitances corresponded to the side buttons 1081 and 1082 are deposed in one of the two circuit boards, and the second oscillator circuit 120 and the capacitances corresponded to the side buttons 1101 and 1102 are deposed in another circuit board.

In the electromagnetic pen 100A, various kinds of the oscillator circuits can be adopted to be the first oscillator circuit 114 and the second oscillator circuit 120 according to the demands of designs, for example Hartley Oscillator circuit, Colpitts Oscillator circuit, Clapp Oscillator circuit or Wine bridge Oscillator circuit.

Figure 5:
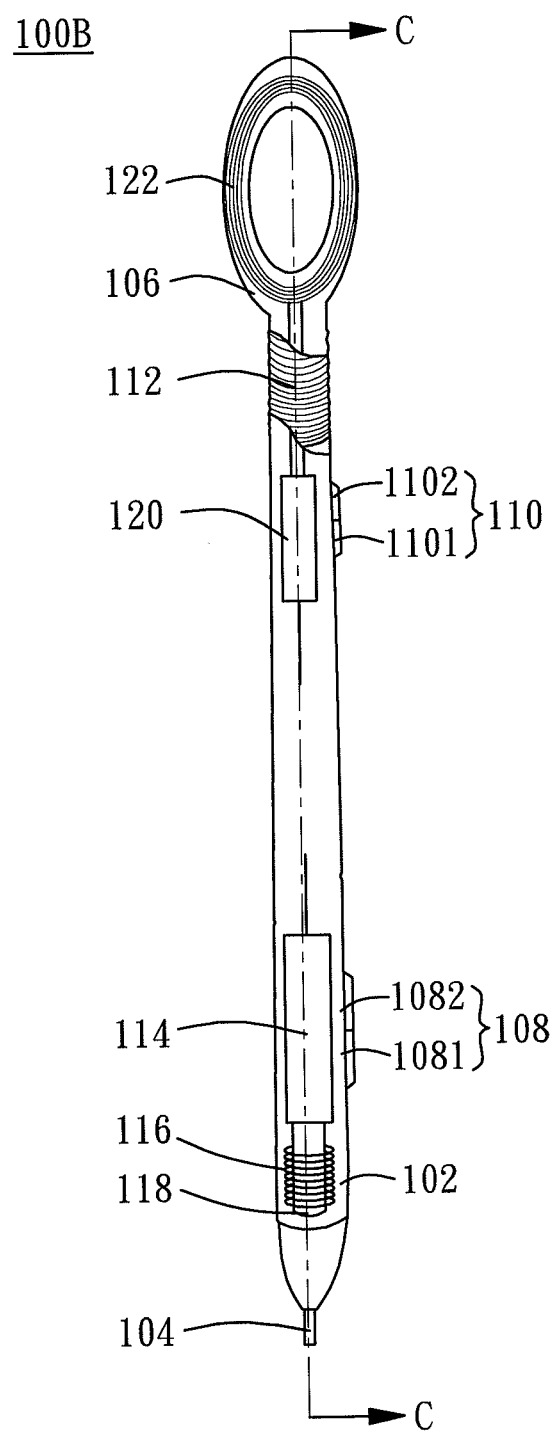
FIG. 5 is a perspective form diagram illustrating a battery-free electromagnetic pen with a multi-function tail part in accordance with one embodiment of the present invention.

Referring to FIG. 5, it is a perspective form diagram illustrating a battery-free electromagnetic pen 100B with a broad, flat, multi-function tail part in accordance with one embodiment of the present invention. The battery-free electromagnetic pen 100B has similar structure with the electromagnetic pen 100A. Both of them comprise a body 102, a pen-tip part 104 and a multi-function electromagnetic ring. Furthermore, both of them have the first oscillator circuit 114 and the second oscillator circuit 120 for emitting or receiving the electromagnetic signals. Both of the battery-free electromagnetic pen 100B and the electromagnetic pen 100A have the first switch 108 and the second switch 110 for respectively controlling the pen-tip part 104 (or the first oscillator circuit 114) and the multi-function electromagnetic ring 106 (or the second oscillator circuit 110) to emit the electromagnetic signals and for respectively controlling or changing the frequencies of the electromagnetic signals emitted by the front part and the rear flat multi-function electromagnetic ring 106.

However, the difference between the battery-free electromagnetic pen 100B and the electromagnetic pen 100A with a battery is that there is no any battery capable of providing power in the electromagnetic pen 100B. When the pen-tip part 104 of the electromagnetic pen 100B is applied to write or select on the tablet, the first coil 116 induces with the electromagnetic power emitted from the tablet, and then the first oscillator circuit 114 resonates with the electromagnetic power emitted from the tablet and stores the electromagnetic power. The stored power is provided to the first oscillator circuit 114 for emitting the electromagnetic signals. Similarly, when the multi-function electromagnetic ring 106 of the electromagnetic pen 100B performs the erasing function, the magnifying function or the palette knife function, the second coil 122 induces with the electromagnetic power emitted from the tablet, and then the second oscillator circuit 120 resonates with the electromagnetic power emitted from the tablet and stores the electromagnetic power. The stored power is provided to the second oscillator circuit 120 for emitting the electromagnetic signals.

In the battery-free electromagnetic pen 100B, both of the first oscillator circuit 114 and the second oscillator circuit 120 are LC circuits, and they can be directly deposed in the body 102 (as showed in FIG. 5), or they are deposed on a circuit board previously and then the circuit board is deposed in the body 102.

Furthermore, in the electromagnetic pen 100 (including the battery-free electromagnetic pen 100B and the electromagnetic pen 100A with a battery), the multi-function electromagnetic ring 106 is connected with the tail part of the body 102 by a bending part 112, which is capable of bending toward any direction, and said multi-function electromagnetic ring can be bent at any angle freely. Therefore, like a typical straw capable of being bent at any angle by the user, the multi-function electromagnetic ring 106 also can be bent at any angle freely. It is convenient to the user.

Furthermore, no matter above-mentioned battery-free electromagnetic pen 100B or electromagnetic pen 100A with a battery, the pen-tip parts 104 of them are "sharp-shaped" pen-tips and they are the same with the pen-tip of the conventional electromagnetic pen. The pen-tip parts 104 of the battery-free electromagnetic pen 100B and the electromagnetic pen 100A with a battery have the same operation mode and function. However, in the electromagnetic pens (including the electromagnetic pen 100, 100A and 100B) of this invention, a broad, flat, multi-function electromagnetic ring is applied to the electromagnetic pen instead of the cylindrical eraser, which has a circular head, of the conventional electromagnetic pen, and the user controls and changes the frequency of the electromagnetic signal emitted from the multi-function electromagnetic ring 106 by the second switch 110. Therefore, the tail part of the electromagnetic pen of this invention no longer has a single function of erasing and a single operation mode with a need of contact with the tablet. It can have more functions and operation modes, and the functions and operation modes include at least three functions and operation modes showed as following:

The first function of the tail part (or the multi-function electromagnetic ring) of the electromagnetic pen of this invention is the erasing function (or the eraser function). When the multi-function electromagnetic ring 106 is controlled by the second switch 110 to emit the electromagnetic signal with the frequency which is defined as the frequency of the electromagnetic signal representing the erasing mode by the tablet, the multi-function electromagnetic ring 106 continuously emits this electromagnetic signal defines as the erasing electromagnetic signal by the tablet until the situation of the second switch is changed. Therefore, the flat tail part (or the multi-function electromagnetic rings 106) of the electromagnetic pens 100, 100A and 100B of this invention are hovered over the tablet by the user without contact with the tablet. They have no need to directly contact (or touch) and rub with the tablet, Therefore, the erasing mode performed by the electromagnetic pens 100, 100A and 100B are different from the erasing mode performed by the conventional electromagnetic pen. Furthermore, the wear of the tail part of the electromagnetic pen and the damages of the tablet, which are caused by the contact and rub between the tail part of the electromagnetic pen and the tablet, can be prevented, and the uncomfortable noises caused by the contact and rub between the tail part of the electromagnetic pen also can be prevented.

Besides, there is no need of a spring structure for turning on and controlling the erasing mode, because the flat tail parts (or the multi-function electromagnetic pen 106) of the electromagnetic pens 100, 100A and 100B have no need to contact with the tablet. The second switch 110 deposed on the body 102 is directly used by the user for turning on and controlling the erasing mode instead. Therefore, comparing with the conventional electromagnetic pen, the structures of the electromagnetic pens 100, 100A and 100B are simpler and the cost for fabricating them is reduced. The film 111 of the multi-function electromagnetic ring 106 is a transparent film, which has a crisscross pattern or a circular pattern formed on a surface thereof by printing or etching. Therefore, it assists the user to recognize the center point of the erasing area. When the tail part (or the multi-function electromagnetic ring 106) of the electromagnetic pen 100, 100A or 100B emits the electromagnetic signal representing the erasing mode (or function), the application program corresponded to the erasing mode in the tablet receives the information, which is transferring from the tablet and includes the mode ID of the tail part of the electromagnetic pen, coordinates (X/Y) and the situation of the second switch, and then the application program recognizes that the tail part (or the multi-function electromagnetic ring 106) of the electromagnetic pen 100, 100A or 100B is in erasing mode and the application program erases words, patterns, color or the other objects in the area of the screen of the tablet passed by the tail part (or the multi-function electromagnetic ring 106).

The second function of the tail part (or the multi-function electromagnetic ring) of the electromagnetic pen of this invention is the magnifying function (or the magnifier function). When the multi-function electromagnetic ring 106 is controlled by the second switch 110 to emit the electromagnetic signal with the frequency which is defined as the frequency of the electromagnetic signal representing the magnifying mode by the tablet, the multi-function electromagnetic ring 106 continuously emits this electromagnetic signal defines as the magnifying electromagnetic signal by the tablet until the situation of the second switch is changed. When the tablet receives the magnifying electromagnetic signal emitted from the multi-function electromagnetic ring 106, then, the application program can receive corresponding data through tablet's driver program. The application program start to operate at the magnifying mode (or magnifier mode) and partially magnifies the image (including words, patterns and so forth) just at the location of the rear part points to. That is to say, when the multi-function electromagnetic ring 106 hovers over tablet at eraser mode, the application program can receive the information including the mode ID of the tail part of the electromagnetic pen, coordinates (X/Y) and the situation of the second switch. At this time, the application program can make the pen to simulate the magnifier in real world and then the small area designated by the multi-function electromagnetic ring 106 is magnified. When the multi-function electromagnetic ring 106 moves to next area on tablet, the magnified image in previous area is automatically restored and the image in the new area is magnified.

The third function of the tail part (or the multi-function electromagnetic ring) of the electromagnetic pen of this invention is the oil painting function (or the palette knife function). When the multi-function electromagnetic ring 106 is controlled by the second switch 110 to emit the electromagnetic signal with the frequency which is defined as the frequency of the electromagnetic signal representing the oil painting mode (or the palette knife mode) by the tablet, the multi-function electromagnetic ring 106 continuously emits this electromagnetic signal defines as the electromagnetic signal for the oil painting mode (or the palette knife mode) by the tablet until the situation of the second switch is changed. The multi-function electromagnetic ring of this invention has a broad, flat circular shape or an elliptical structure similar to the head of the palette knife, and it is different from the "sharp-shaped" pen-tip of the conventional electromagnetic pen or the eraser of the conventional electromagnetic pen, which has a circular head. Therefore, it can be used as a real palette knife to paint on the tablet with actions of pressing, dragging, wiping and scraping. Therefore, the painting on the tablet can simulate the paint effects of oil paintings.

When the tablet receives the electromagnetic signal, which is defined as the electromagnetic signal for oil painting mode (or the palette knife mode) and is emitted from the multi-function electromagnetic ring 106, the application program corresponded to the oil painting mode (or the palette knife mode) paints color toward the direction, which the tail part (or the multi-function electromagnetic ring 106) moves toward, according to the information which is transferring from the tablet and includes the mode ID of the tail part of the electromagnetic pen, coordinates (X/Y) and the situation of the second switch. Therefore, the area of the tablet passed by the multi-function electromagnetic ring 106 can perform the paint effects of oil painting. Furthermore, in the oil painting mode (or the palette knife mode), the function of the tail part (or the multi-function electromagnetic ring 106) is changed to be the function of removing color from the oil painting by a palette knife and then the oil painting on the screen of the tablet can be removed and a new color is painted.

Of course, the tail part (or the multi-function electromagnetic ring) is not limited to have above-mentioned three functions or modes, and it can have other functions by installing the application programs corresponded to these functions according the demands of designs. In this invention, each of frequencies of the electromagnetic signals emitted from the multi-function electromagnetic ring represents one function and mode. The frequency of the electromagnetic signal emitted from the multi-function electromagnetic ring is controlled by the second switch deposed on the part of the body of the electromagnetic pen near the tail part. Therefore, the second switch control the multi-function electromagnetic ring (or the tail part) to change it's current function and mode.

Therefore, an electromagnetic pen with a multi-function tail part is provided. As a result that the function and mode (for example erasing function and mode) of the tail part is turned on and changed by a switch deposed on this electromagnetic pen, the electromagnetic pen can perform the function and mode (for example erasing) over the tablet without the need of contact with the tablet. Therefore, the noises and damage caused by contact and rub between the tail part and the tablet can be prevented and there is no need of a spring structure. Accordingly, the electromagnetic pen of this invention has the characteristics of simple structure and low cost. Furthermore, the tail part (or the multi-function electromagnetic ring) of this electromagnetic pen can have various functions because the tail part (or the multi-function electromagnetic ring) of this electromagnetic pen is directly controlled by the switch deposed on the electromagnetic pen for emitting the electromagnetic signals with different frequencies.

What is claimed is:

1. An electromagnetic pen with a multi-function tail part, comprising:
 a body having a front part and tail part wherein there are a first oscillator circuit disposed in said front part of said body and a second oscillator circuit disposed in said tail part of said body and said first oscillator circuit comprises a first coil wound around a permeability material and distributed in a direction parallel to center line of said body;
 a pen-tip part disposed on said front part of said body for writing or selecting on a tablet; and
 a multi-function electromagnetic ring disposed on said tail part of said body for emitting different electromagnetic signals to make said tail part of said electromagnetic pen to perform different functions in different situations wherein said second oscillator circuit comprises a second coil disposed in said multi-function electromagnetic ring and said second coil is wound around inside said multi-function electromagnetic ring and distributed in a direction perpendicular to center line of said body and the direction in which said second coil is distributed is perpendicular to the direction in which said first coil is distributed,
 wherein there is a film disposed on central area of said multi-function electromagnetic ring, and
 wherein there is a crisscross pattern or a circular pattern formed on a surface of said film by printing or etching for assisting a user to recognize the center point of said multi-function electromagnetic ring for sensing.

2. The electromagnetic pen with a multi-function tail part of claim 1, wherein said film is a glass, a thin film or a piece of plastics.

3. The electromagnetic pen with a multi-function tail part of claim 1, wherein said first oscillator circuit is disposed in said front part of said body for emitting electromagnetic signal to enable said pen-tip to write or select on the tablet.

4. The electromagnetic pen with a multi-function tail part of claim 3, wherein said second oscillator circuit is disposed in said tail part of said body for emitting different electromagnetic signals with different frequencies to enable said multi-function electromagnetic ring to perform erasing function, magnifying function, or palette knife function.

5. The electromagnetic pen with a multi-function tail part of claim 4, further comprising a circuit board disposed in said body wherein said first oscillator circuit and said second oscillator circuit are disposed on said circuit board.

6. The electromagnetic pen with a multi-function tail part of claim 4, further comprising two circuit boards disposed in said body wherein said first oscillator circuit and said second oscillator circuit are disposed on the two circuit boards respectively.

7. The electromagnetic pen with a multi-function tail part of claim 4, further comprising a battery for providing power to said first oscillator circuit and said second oscillator circuit to emit electromagnetic signals.

8. The electromagnetic pen with a multi-function tail part of claim 4, wherein said first oscillator circuit is resonated with electromagnetic power emitted from a tablet to receive and store the electromagnetic power for providing power to said first oscillator circuit for emitting electromagnetic signals.

9. The electromagnetic pen with a multi-function tail part of claim 4, wherein said second oscillator circuit is resonated with electromagnetic power emitted from a tablet to receive and store the electromagnetic power for providing power to said second oscillator circuit for emitting electromagnetic signals.

10. The electromagnetic pen with a multi-function tail part of claim 4, wherein there is a first switch disposed in a part of said body near said pen-tip part for controlling frequencies of electromagnetic signals emitted from said first oscillator circuit.

11. The electromagnetic pen with a multi-function tail part of claim 4, wherein there is a second switch disposed in a part of said body near said multi-function electromagnetic ring for controlling frequencies of electromagnetic signals emitted from said second oscillator circuit and for changing functions of said multi-function electromagnetic ring.

12. The electromagnetic pen with a multi-function tail part of claim 1, wherein said multi-function electromagnetic ring is connected with said tail part of said body by a bending part, which is capable of bending toward any direction, and said multi-function electromagnetic ring can be bent at any angle freely.

13. The electromagnetic pen with a multi-function tail part of claim 1, wherein said pen-tip part is a sharp-shaped pen-tip.

\* \* \* \* \*